Aug. 11, 1970   J. E. MARSHALL   3,523,658
EXTENSIBLE, OBJECT-SUPPORTING MEMBRANE AND MEANS FOR
CONTROLLING DEPLOYMENT THEREOF
Filed April 3, 1968

JOHN E. MARSHALL
INVENTOR.

BY
Charles E. Woodward
ATTORNEY

United States Patent Office 3,523,658
Patented Aug. 11, 1970

3,523,658
EXTENSIBLE, OBJECT-SUPPORTING MEMBRANE AND MEANS FOR CONTROLLING DEPLOYMENT THEREOF
John E. Marshall, Fort Worth, Tex., assignor to General Dynamics Corporation, Fort Worth, Tex., a corporation of Delaware
Filed Apr. 3, 1968, Ser. No. 718,616
Int. Cl. B64g 1/00; H01q 1/28
U.S. Cl. 244—1
4 Claims

ABSTRACT OF THE DISCLOSURE

A device, the function of which is to project objects such as antennas, probes, meters, transducers and like instruments into a desired spatial relationship with a base vehicle or other basal body along a prescribed axis to thereby extend or enhance the instrument's plenary function, unimpeded by ambient substance or conditions. A collapsed and stowed inflatable membrane carrying the object is progressively inflated and controllably deployed from about a stowage mandrel having a fluid orifice conduit therethrough for passage of an inflating medium such as air or gas and a thin, circumjacent, slotted disc having a radially inwardly and axially directed portion which functions to bear upon the inflatable membrane; the slots in the disc acting to form resilient fingers which bear upon the membrane as it moves from the mandrel's end to thereby control the deployment or extension thereof along a predetermined axis and thus prevent uncontrolled gyrations, writhing and other random motions of the partially inflated membrane.

---

The present invention relates generally to a device for controlling the deployment or extension of an inflatable tube-like cylindrical membrane along a predetermined and prescribed axis to thereby prevent uncontrolled random motions which are normally attendant during deployment of a partially inflated flexible membrane receptacle of this type.

More particularly the invention relates to a fluid-pressure extensible-staff membrane capable of being deployed as an inflated tube or cylinder and having a related mandrel and detrusive fingered disc device which provides for controlled and orderly inflationary expansion and resultant extension of the staff membrane along a prescribed axis during deployment, thus precluding any normally attendant violent and uncontrolled random excursions of the partially inflated membrane staff structure.

It is often necessary or desirable, particularly in the design and use of aerospace vehicles, space-operating stations, and related areas, to quickly project or extend various instruments, such as communication antennae and various types of meters for measuring physical phenomena such as gravity meters, magnetometers, etc.—as well as television scanners, beacons and various other scopes for making visual observations—into positions spatially removed from the instrument's carrier vehicle or other basal medium. In order to provide such an extensible instrumentality, which would be of almost negligible weight, yet have the structural strength necessary to easily extend and sustain its load in position while also being sufficiently flexible in character as to have the capability for being compactly stowed when in transit or not otherwise in use, into a space envelope of minimal volume. The present invention resides in a mandrel supported membrane, having a closed end, which is capable of being extended or deployed through the process of progressive inflation, resultant in its erection and extension along a predetermined and prescribed axis to form an instrument supporting shaft or staff.

An object of the present invention is to provide a device for controlling progressive fluid inflation and resultant extensible deployment of a flexible tubular or cylindrical membrane along a predetermined and prescribed axis, thereby precluding the normally attendant violent and uncontrolled writhing, gyrating and other random motions of the partially inflated and partially extended membrane.

Another object of the invention is to provide a collapsible cylindrical or tubular membrane that may be compactly stowed, when not in use, upon a mandrel having a fluid passage therethrough, and a relatively thin slotted disc circumjacent the membrane-bearing mandrel, and having inwardly biased finger elements which bear upon the membrane and against the stowage mandrel while the membrane is receiving an inflating fluid for effecting its deployment and resultant extension thereof to form a supporting staff for various objects or instruments.

A further object is to provide a device of the above class and character that is simple in construction, economical to manufacture and quickly and efficiently performs its intended function.

These and other objects and advantages will become more readily apparent to those skilled in the art from the following description and the appended drawings, wherein.

Figure 1:
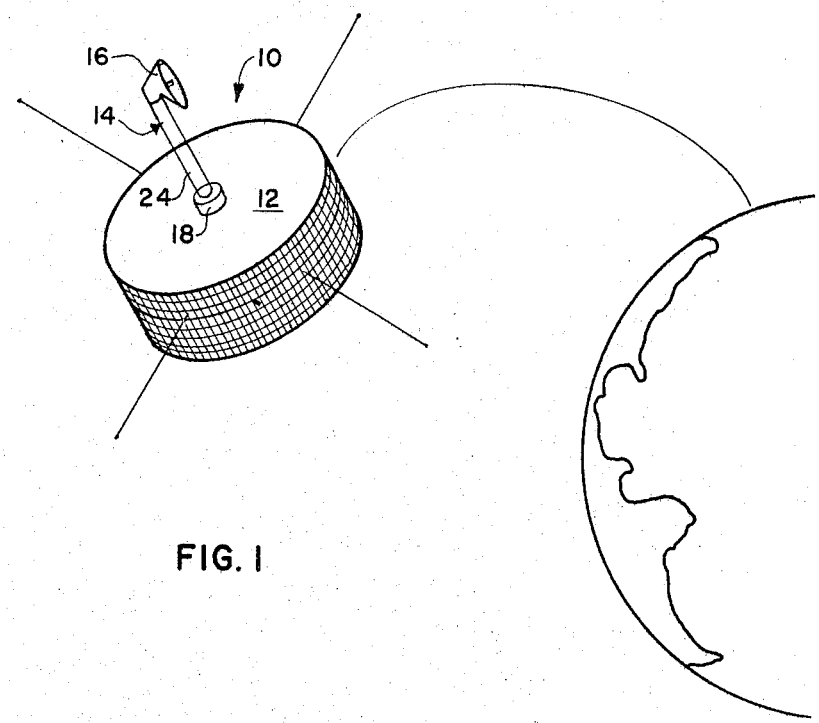
FIG. 1 is a pictorial isometric view of a conventional space-orbital vehicle incorporating the device of the invention and which is exemplary of one type of carrier that may effectively embody and readily utilize the present invention in its operation.

Referring now to FIG. 1, there is shown a satellite type space vehicle 10 having an upper face 12 to which is affixed the presently invented composite device 14, an instrument 16 or other object to be projected from and maintained in fixed spatial relationship with vehicle 10 mounted upon the upper end of staff-membrane 24, such as an antenna, together with stowage chamber 18 for housing the fitting mandrel about which tubular sealed membrane 24 is compactly sheathed for stowage when in its deflated and collapsed state and therefore not in use.

Figure 2:
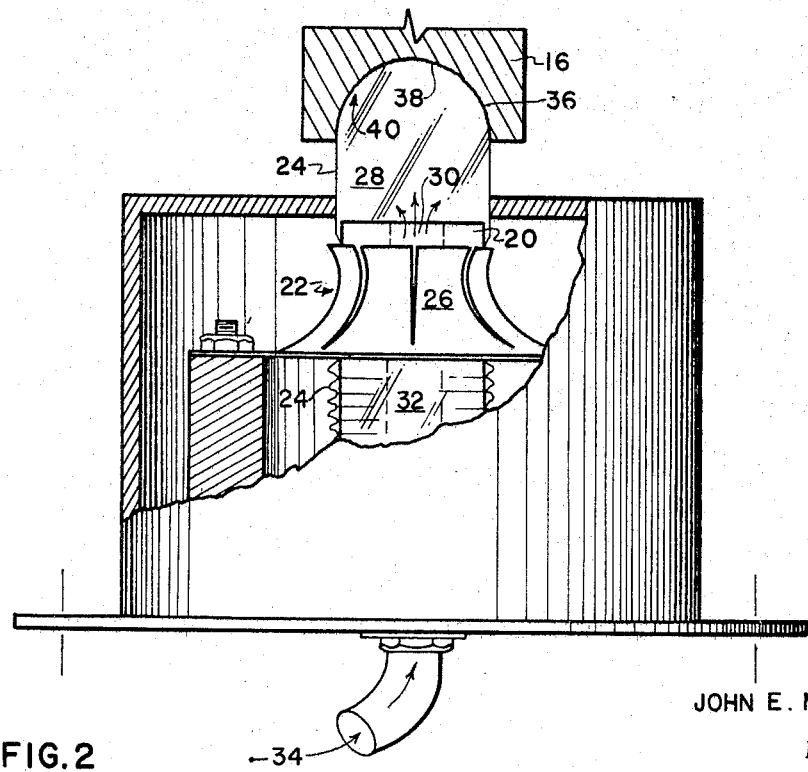
FIG. 2 is a partially cut-away sectional view, in elevation, of the invented device, showing constituent elements and their functional relationships.

The device may be seen with more clarity and better described from FIG. 2 of the drawings. Here, the invented composite device is shown to comprise three basic elements: a cylindrical mandrel 20, a fingered, membrane-restraining, slip-clutch disc component 22 and a collapsible/extensible, closed and sealed membrane 24 which provides a staff-like supporting element for instruments or other objects upon being erected and extended by fluid pressure inflation, such as with gas, compressed air and the like.

The lower portion of tubular or cylindrical membrane envelope 24, yet to be inflated and extended is shown in its stowed position and forming a sheath-like envelope about mandrel 20; the mandrel being of slightly smaller diameter than that of the envelope of the inflatable membrane Slotted-disc, slip-clutch component 22 is slidably received over mandrel 20, with the sectors 26 of the slotted disc serving as spring-biased, fingers for restraining the membrane walls of envelope 24 against the surface of mandrel 20. With the membrane 24 fitted about and around mandrel 20, as shown, and its sealed upper end 28 forming a closed canopy over the upper end of mandrel 20 and consequently over the inlet port 30 of orifice 32 passing through mandrel 20, a pressurized inflatant fluid, such as gas or air, is introduced into the canopy 28 formed by membrane 24 from a conventional source 34 through orifice 32 and inlet port 30.

As pressure increases against membrane 24 of envelope 28 above and about port 30, tension forces resultant therefrom develop a reaction against the upper face of mandrel 20, which acts to project the upper portion of membrane envelope 28 upward and outward to thereby withdraw the stowed membrane material 24 from about the lower portion of mandrel 20 by overcoming the spring-biased restraining forces imposed thereagainst by the detrusive fingers 26 of slotted-disc slip-clutch component 22 which press the membrane material against the mandrel.

Slotted-disc, slip-clutch component 22, being restrained from motion only along the axis of mandrel 20, imparts equal pressure, at the contact point of spring-biased fingers 26, all around the mandrel, resultant in an even dispersion of membrane material 24, in the same plane around the periphery of both membrane and mandrel.

Objects to be axially projected and maintained in a fixed spatial relationship with carrier vehicle 10 or other basal structure, such as antenna 16, FIG. 1, may have a concave base 36, FIG. 2, adhesively bonded at 38 to the upper closed spherical portion 40 of membrane 24, generally as shown.

Other objects and instruments in addition to those enumerated above include but are not limited to such instruments as radiation counters and dosimeters, ultraviolet and infra-red spectrometers and like heat and light meters. Further, the device of the invention may be effectively employed in manned or remote experimental space packages to effectively position or separate magnetometers and other critical instruments from magnetic or metallic substances making up the structure of the vehicle or it may be employed as a mechanical aid in rendezvous or transfer maneuvers of the spacecraft.

In all cases, if the deployment of such inflatable structure is not controlled, violent uncontrolled excursions, gyrations and writhing will occur during extension. Such whiplash-like motions generally result in damage to the extensible membrane structure and to any attached sensor, radiator or other delicate instrument as well as to the supporting or adjacent equipment, personnel and the like.

The usefulness of such an extendibly deployed structure is not limited to aerospace and space applications, since deployment of an inflated tubular or cylindrical balloon-like membrane can very well perform a necessary function in a number of other ways. They can be employed as quickly erected antennae or beacons, relay dish reflectors and the like both on the earth's surface or other planets and their satellites.

I claim:
1. A collapsible and extensible device for the controlled projection of an object from its stowed position on a basal body, along a predetermined axis and for maintaining it in a desired spatial relationship with the body while the object extended is preforming its plenary function, comprising, in combination:
    (A) a basal body;
    (B) a collapsible/extensible, flexuous, object supporting means, closed and substantially sealed to define an envelope when inflated, in functional communication with said basal body;
    (C) mandrel means for stowage of said object supporting means when said supporting means is deflated, collapsed and not in use;
    (D) conduit means associated with said mandrel means for passage of an inflatant fluid into said object supporting means for effecting inflation and resultant extension thereof;
    (E) restraining means circumjacent the upper portion of said mandrel radially spring biased in respect to said mandrel for limiting slippage of said support means and thereby effecting issue rate control, resultant in straight axial deployment of said object supporting means during the inflation and extension thereof.

2. The device defined in claim 1, wherein said flexuous object supporting means is a closed and sealed inflatable tubular membrane defining an enclosure.

3. The device recited in claim 1, wherein said flexuous object supporting means is a closed and sealed polyhedral membrane defining an enclosure.

4. The device recited in claim 1, wherein said restraining means is a thin slotted disc having a segmented radially inwardly and axially directed portion spring-biased to bear upon the object supporting means while said last named means is being inflated so as to control the rate of deployment thereof, thereby effecting its extension along a predetermined axis and simultaneously precluding normally attendant random motions.

References Cited

UNITED STATES PATENTS

| | | | |
|---|---|---|---|
| 1,285,940 | 11/1918 | Chodakowski | 343—915 |
| 3,278,938 | 10/1966 | Rosenthal | 343—915 |
| 3,417,942 | 12/1968 | Van Alstyne | 244—1 |

FERGUS S. MIDDLETON, Primary Examiner

U.S. Cl. X.R.

343—881